United States Patent
Whitmore et al.

(10) Patent No.: US 7,991,827 B1
(45) Date of Patent: Aug. 2, 2011

(54) NETWORK ANALYSIS SYSTEM AND METHOD UTILIZING COLLECTED METADATA

(75) Inventors: Brent S Whitmore, York, PA (US); William J. La Cholter, Washington, DC (US); Geoff Lawler, Baltimore, MD (US)

(73) Assignee: McAfee, Inc., Santa Clara, CA (US)

( * ) Notice: Subject to any disclaimer, the term of this patent is extended or adjusted under 35 U.S.C. 154(b) by 1161 days.

(21) Appl. No.: 10/294,363

(22) Filed: Nov. 13, 2002

(51) Int. Cl.
*G06F 15/16* (2006.01)

(52) U.S. Cl. . 709/203; 709/220; 709/223; 707/999.001; 707/999.002; 707/999.004; 707/999.01

(58) Field of Classification Search .................. 709/201, 709/203, 223–225, 229, 245, 250, 220; 370/241, 370/253, 224, 231, 252, 400; 707/1, 2, 10, 707/4, 999.001, 999.002, 999.004, 999.01
See application file for complete search history.

(56) References Cited

U.S. PATENT DOCUMENTS

| | | | |
|---|---|---|---|
| 4,685,124 A | 8/1987 | Smitt et al. ...................... 379/95 |
| 5,038,307 A | 8/1991 | Krishnakumar et al. ..... 364/578 |
| 5,878,144 A * | 3/1999 | Aucsmith et al. ............... 380/30 |
| 5,933,602 A * | 8/1999 | Grover .......................... 709/224 |
| 5,999,711 A * | 12/1999 | Misra et al. ........................ 726/4 |
| 6,044,401 A * | 3/2000 | Harvey ......................... 709/225 |
| 6,278,694 B1 * | 8/2001 | Wolf et al. .................... 370/253 |
| 6,327,620 B1 * | 12/2001 | Tams et al. .................... 709/224 |
| 6,381,628 B1 * | 4/2002 | Hunt ............................. 709/201 |
| 6,418,428 B1 * | 7/2002 | Bosch et al. ...................... 707/2 |
| 6,453,360 B1 * | 9/2002 | Muller et al. ................. 709/250 |
| 6,606,708 B1 * | 8/2003 | Devine et al. ..................... 726/8 |
| 6,714,513 B1 * | 3/2004 | Joiner et al. .................. 370/224 |
| 6,742,128 B1 * | 5/2004 | Joiner ............................. 726/25 |
| 6,795,846 B1 * | 9/2004 | Merriam ....................... 709/203 |
| 6,801,604 B2 * | 10/2004 | Maes et al. ................. 379/88.17 |
| 6,807,181 B1 * | 10/2004 | Weschler ...................... 370/400 |
| 6,836,806 B1 * | 12/2004 | Raciborski et al. ........... 709/245 |
| 6,901,051 B1 * | 5/2005 | Hou et al. ..................... 370/231 |
| 6,941,467 B2 * | 9/2005 | Judge et al. .................... 726/22 |
| 6,957,199 B1 * | 10/2005 | Fisher ............................. 705/78 |
| 6,965,574 B1 * | 11/2005 | Cook et al. .................... 370/252 |
| 6,985,939 B2 * | 1/2006 | Fletcher et al. ............... 709/223 |
| 7,016,951 B1 * | 3/2006 | Longworth et al. .......... 709/224 |
| 7,035,944 B2 * | 4/2006 | Fletcher et al. ............... 709/250 |
| 7,114,183 B1 * | 9/2006 | Joiner ............................. 726/23 |
| 7,151,966 B1 * | 12/2006 | Baier et al. ..................... 700/19 |
| 7,155,425 B2 * | 12/2006 | Nykanen ........................... 707/3 |
| 7,159,007 B2 * | 1/2007 | Stawikowski ................. 709/202 |

(Continued)

FOREIGN PATENT DOCUMENTS

WO 00/28437 A1 5/2000

(Continued)

OTHER PUBLICATIONS

"Parse" and "Parser", Answers.com, Online Dictionary, pp. 1- 5.*

(Continued)

*Primary Examiner* — Khanh Q Dinh
*Assistant Examiner* — Saket K Daftuar
(74) *Attorney, Agent, or Firm* — Patent Capital Group

(57) ABSTRACT

A system, method and computer program product are provided for analyzing network traffic associated with network services. Initially, network traffic and metadata are collected from a network. Thereafter, the network traffic is analyzed utilizing the metadata.

36 Claims, 5 Drawing Sheets

U.S. PATENT DOCUMENTS

| | | | |
|---|---|---|---|
| 7,177,862 B2 * | 2/2007 | Zhang et al. | 707/4 |
| 7,188,114 B2 * | 3/2007 | Liu et al. | 707/100 |
| 7,325,047 B2 * | 1/2008 | Brittenham et al. | 709/220 |
| 7,383,566 B1 * | 6/2008 | Emura | 725/114 |
| 7,570,943 B2 * | 8/2009 | Sorvari et al. | 455/414.1 |
| 2002/0046273 A1 * | 4/2002 | Lahr et al. | 709/224 |
| 2002/0105911 A1 * | 8/2002 | Pruthi et al. | 370/241 |
| 2002/0129133 A1 * | 9/2002 | Olsen | 709/223 |
| 2002/0131423 A1 * | 9/2002 | Chan et al. | 370/400 |
| 2002/0133491 A1 * | 9/2002 | Sim et al. | 707/10 |
| 2002/0147937 A1 * | 10/2002 | Wolf | 714/4 |
| 2002/0163934 A1 * | 11/2002 | Moore et al. | 370/465 |
| 2002/0165957 A1 * | 11/2002 | Devoe et al. | 709/224 |
| 2002/0178214 A1 * | 11/2002 | Brittenham et al. | 709/203 |
| 2002/0178244 A1 * | 11/2002 | Brittenham et al. | 709/223 |
| 2003/0069952 A1 * | 4/2003 | Tams et al. | 709/223 |
| 2003/0101034 A1 * | 5/2003 | Tillotson | 703/13 |
| 2003/0217130 A1 * | 11/2003 | Tang et al. | 709/223 |
| 2003/0217144 A1 * | 11/2003 | Fu et al. | 709/224 |
| 2003/0217162 A1 * | 11/2003 | Fu et al. | 709/229 |
| 2003/0221000 A1 * | 11/2003 | Cherkasova et al. | 709/224 |
| 2004/0015564 A1 * | 1/2004 | Williams | 709/219 |
| 2004/0025044 A1 * | 2/2004 | Day | 713/200 |
| 2004/0043758 A1 * | 3/2004 | Sorvari et al. | 455/414.1 |
| 2004/0073533 A1 * | 4/2004 | Mynarski et al. | 707/1 |
| 2004/0090984 A1 * | 5/2004 | Saint-Hilaire et al. | 370/463 |

FOREIGN PATENT DOCUMENTS

| | | |
|---|---|---|
| WO | 02/10904 A2 | 2/2002 |

OTHER PUBLICATIONS

"Schema", Answers.com, Online Dictionary, pp. 1-4.*
"Metadata", Answers.com, Online Dictionary, pp. 1-3.*
Public Key Certificate, Computer Encylopedia, Answers.com, pp. 1-4.*
WSD, Computer Encylopedia, Answers.com, p. 1.*

* cited by examiner

000# NETWORK ANALYSIS SYSTEM AND METHOD UTILIZING COLLECTED METADATA

FIELD OF THE INVENTION

The present invention relates to networks, and more particularly to the analysis of networks utilizing network analyzers.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network communications, detecting bottlenecks and problems. Using this information, a network manager can keep communications flowing efficiently. A network analyzer may also be used to capture data being transmitted on a network. The term "network analyzer" may further be used to describe a program that analyzes data other than network communications, or may also be used to classify packets into flows. For example, a database can be analyzed for certain kinds of duplication, etc. One specific example of a network analyzer is the SNIFFER® network analyzer manufactured by NETWORK ASSOCIATES, INC®. Traditionally, network analyzers have only been able to collect and analyze network traffic utilizing traditional protocols.

Lately, network-based applications have begun to use a new kind of network services called web services. Until recently, new network services defined their own way of behaving, i.e. their protocol, in an ad hoc fashion. Application client programs needed to inherently know how new protocols worked in order to use the newly developed services. Like their predecessor network services, web services use existing standard protocols, notably hypertext transfer protocol (HTTP), to transport the associated application network traffic.

In use, web services employ additional protocols, called description and discovery services. These services describe how each web service uses the underlying transport protocol to convey the network messages that the particular service needs to complete the necessary work and convey the appropriate results. In this way, web service applications can continue to work when web service protocols change. This permits application developers to divide their software into multiple web services, each defined by the needs of the application.

Network traffic analyzers, like the SNIFFER® network analyzer, typically capture and store network traffic for a period of time, and then interpret the stored traffic to present information about the traffic. With older service protocols, interpretation is straightforward, since they change infrequently.

Unfortunately, interpreting web services presents more of a challenge. A web service application developer expresses much of the application architecture in the related protocols, which change as the application evolves. Network traffic analyzers cannot present much meaningful information about such a vast array of protocols. The information does not mean enough to be useful to the network analyzer users without also acquiring and using adjunct information from other services, like the description and discovery services previously mentioned.

There is thus a need for a network analyzer which overcomes these and other shortcomings in the prior art.

DISCLOSURE OF THE INVENTION

A system, method and computer program product are provided for analyzing network traffic associated with network services. Initially, network traffic and metadata are collected from a network. Thereafter, the network traffic is analyzed utilizing the metadata.

In one embodiment, the network may include the Internet. Still yet, the network services may include web services.

In another embodiment, the network traffic may be correlated with the metadata prior to the analysis of the network traffic. Optionally, the correlating may include operations such as initiating commands as a function of the network traffic. Such commands may optionally include service calls. Moreover, the metadata may be collected in response to the initiation of the commands.

In still another embodiment, the network traffic and the metadata may be stored prior to the analysis of the network traffic. Further, the analysis of the network traffic may occur after an extended period following the collection of the network traffic and the metadata. In one aspect of the present embodiment, the network traffic may be collected after the metadata is collected. In another aspect, the network traffic may be collected before the metadata is collected. Still yet, the network traffic may be collected simultaneously with the metadata.

In one specific embodiment, the analysis of the network traffic may include generating a plurality of parsers. Such parsers may be generated based on the metadata. Specifically, each of the parsers may be associated with a corresponding portion of the metadata, and may further be capable of processing a portion of the network traffic correlating with the metadata portion. In use, the analysis of the network traffic may further include processing the network traffic utilizing the parsers. Still yet, the analysis of the network traffic may further include reporting on at least one aspect of the network traffic based on the processing.

In still another specific embodiment, the analysis of the network traffic may include authenticating the network traffic. In the present embodiment, the network traffic may be authenticated based on an authentication test involving the metadata. Of course, the analysis of the network traffic may include any type of processing that involves the metadata.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings.

DESCRIPTION OF THE PREFERRED EMBODIMENTS

Figure 1:
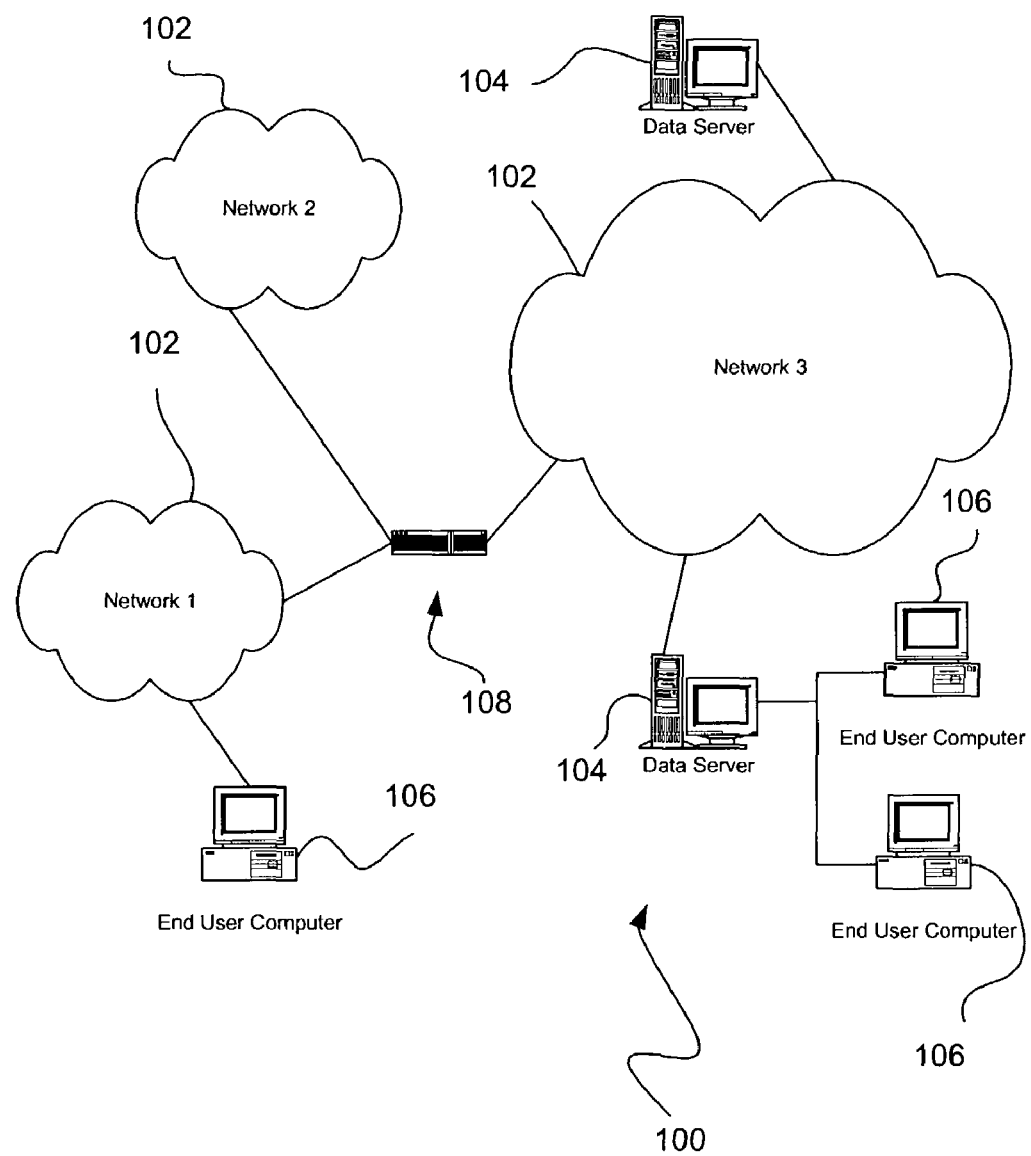
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween. It should be noted that each of the foregoing network devices as well as any other unillustrated devices may be interconnected by way of a plurality of network segments.

Coupled to any one of the foregoing devices and/or segments may be a network analyzer. One exemplary network analyzer that may be used is the SNIFFER® network analyzer manufactured by NETWORK ASSOCIATES, INC®. In use, the network analyzer is generally adapted for monitoring and analyzing network communications, detecting bottlenecks, abnormal traffic, security breaches, other problems, etc. To accomplish this, the network analyzer may be capable of decoding protocols. Furthermore, the network analyzer may be capable of various security functionality (i.e. intrusion detection, virus scanning, firewalling, etc.). Of course, the network analyzer may be capable of any type of analysis of a network and/or network traffic.

In one embodiment, the network analyzer is capable of analyzing network traffic associated with network services. Initially, network traffic and metadata are collected from a network such as that of FIG. 1, for example. Thereafter, the network traffic is analyzed utilizing the metadata. More information regarding such a network analyzer and various embodiments of the related functionality will be set forth with reference to subsequent figures.

Figure 2:
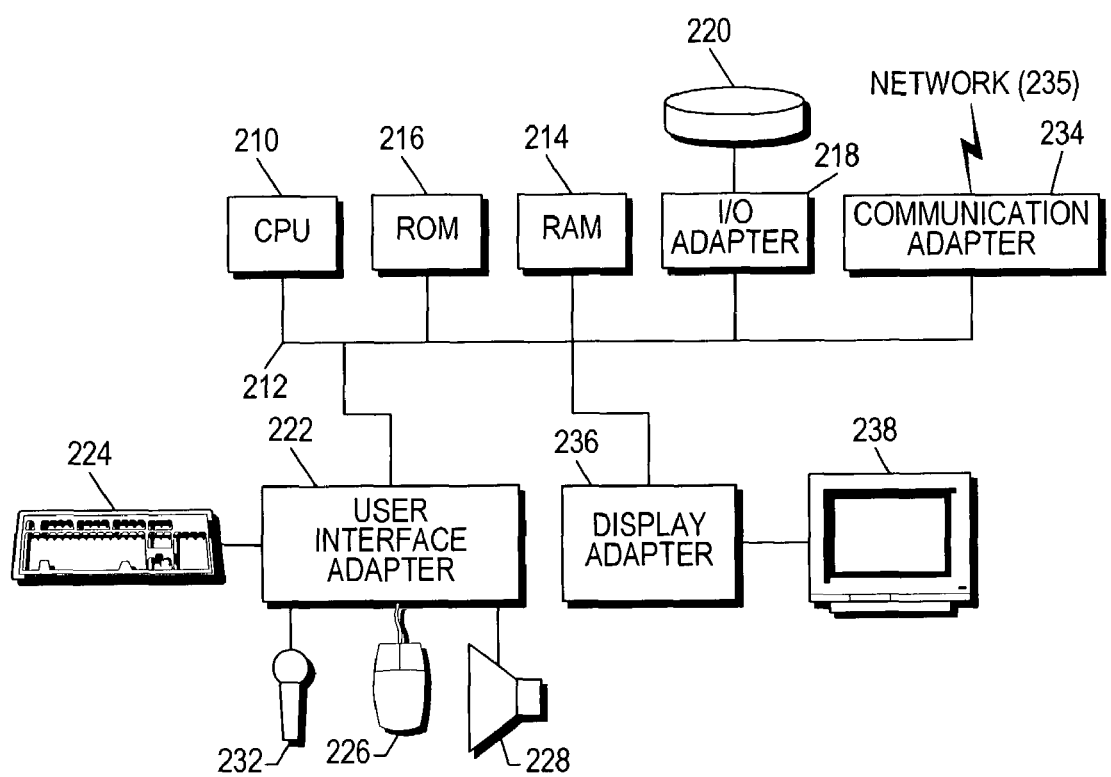
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
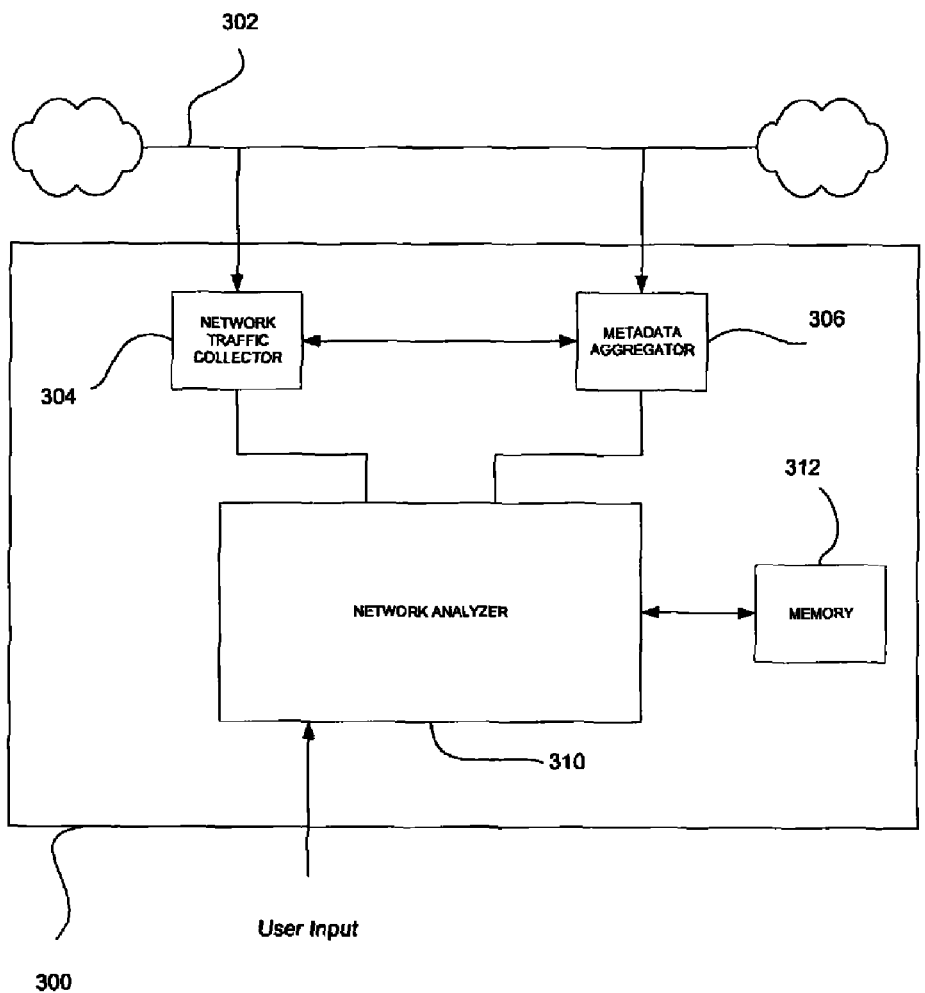
FIG. 3 illustrates a network analysis system adapted for analyzing network traffic associated with network services, in accordance with one embodiment.

FIG. 3 illustrates a network analysis system 300 adapted for analyzing network traffic associated with network services, in accordance with one embodiment. As an option, the present analysis system 300 may be implemented in the context of the architecture of FIGS. 1 and 2. Of course, the analyzer may be implemented in any desired context.

As shown, a network traffic collector 304 is coupled to a portion 302 of a network. In use, the network traffic collector 304 is capable of collecting network traffic from the network. In the context of the present description, the network traffic may include any information or data communicated via the network.

In the present description, such network services may include web services or any type of service including a combination of programming and data that is implemented over a network such as the Internet. Such services may optionally interact with humans as well. Moreover, the services may be related to any aspect (i.e. financial-related, travel-related, computer maintenance-related, data processing-related, manufacturing-related, etc.) of a user, computer, network, etc.

Also coupled to the network portion 302 is at least one metadata aggregator 306 adapted for collecting metadata associated with the network traffic from the network. In the context of the present description, metadata may include certificates, rules, policies, logic, authentication data, database schemas, protocol schemas, other schemas, and/or any type of data that describes at least one aspect of the network traffic.

The metadata aggregator 306 further facilitates the collection of the metadata by generating commands (i.e. service calls, etc.) as a function of network traffic collected by the network traffic collector 304, stored network traffic, and/or a software configuration. The aforementioned network services, in turn, generate the metadata in response to the commands. Such metadata is then collected by the metadata aggregator 306 for the purpose of facilitating the analysis of the network traffic.

To accomplish this network analysis, a network analyzer 310 is coupled to the network traffic collector 304, and the metadata aggregator 306. The network analyzer 310 is further adapted to receive input from a user and utilize memory 312 coupled thereto for facilitating the network analysis.

In the context of the present description, the analysis of the network traffic may involve monitoring and analyzing network communications, detecting bottlenecks, abnormal traffic, problems, carrying out various security functionality, and/or any type of analysis of a network and/or network traffic. Moreover, in one embodiment, such analysis may be carried out in the context of network traffic associated with network services to improve a network service environment. More information regarding some optional functionality will be set forth during reference to subsequent figures.

Web services have been set forth herein as an example of network services which may be analyzed in the context of the various embodiments set forth herein. Currently, web services are services that are made available from a business web server for web users and/or other web-connected programs such as email servers. A web server is a program that, using the client/server model and, usually, the world wide web (WWW) hypertext transfer protocol (HTTP), serves the files that form web pages to web users (whose computers contain HTTP clients that forward users' requests).

Providers of web services are generally known as application service providers. Web services range from such major services as storage management and customer relationship management (CRM) down to much more limited services such as the furnishing of a stock quote and the checking of bids for an auction item. The accelerating creation and availability of these services is a growing trend. Users can access some web services through a peer-to-peer arrangement rather than by going to a central server. Some services can communicate with other services. This exchange of procedures and data is generally enabled by a class of software known as middleware.

Services previously possible only with the older standardized service known as electronic data interchange (EDI) increasingly are likely to become web services. Besides the standardization and wide availability to users and businesses of the Internet itself, web services are also increasingly enabled by the use of the extensible markup language (XML) as a means of standardizing data formats and exchanging data. XML is the foundation for the web services description language (WSDL).

The WSDL is an XML-based language used to describe the services a business offers and to provide a way for individuals and other businesses to access those services electronically. WSDL is the cornerstone of the universal description, discovery, and integration (UDDI) initiative spearheaded by Microsoft®, IBM®, and Ariba®. UDDI is an XML-based registry for businesses worldwide, which enables businesses to list themselves and their services on the Internet. WSDL is the language used to do this.

WSDL is derived from the Microsoft® simple object access protocol (SOAP) and the IBM® network accessible service specification language (NASSL). WSDL replaces both NASSL and SOAP as the means of expressing business services in the UDDI registry. While WSDL is set forth herein as the current language of implementing web services, it should be noted that any type of language may be utilized going forward to accomplish similar objectives.

Moreover, a number of new products are continuing to emerge that enable software developers to create or modify existing applications that can be "published" (made known and potentially accessible) as web services. These services as well as any other network services are considered with the scope of the various embodiments set forth herein. Again, such network services may include any type of service (i.e. combination of programming and data) that is carried out over a network such as the Internet.

Figure 4:
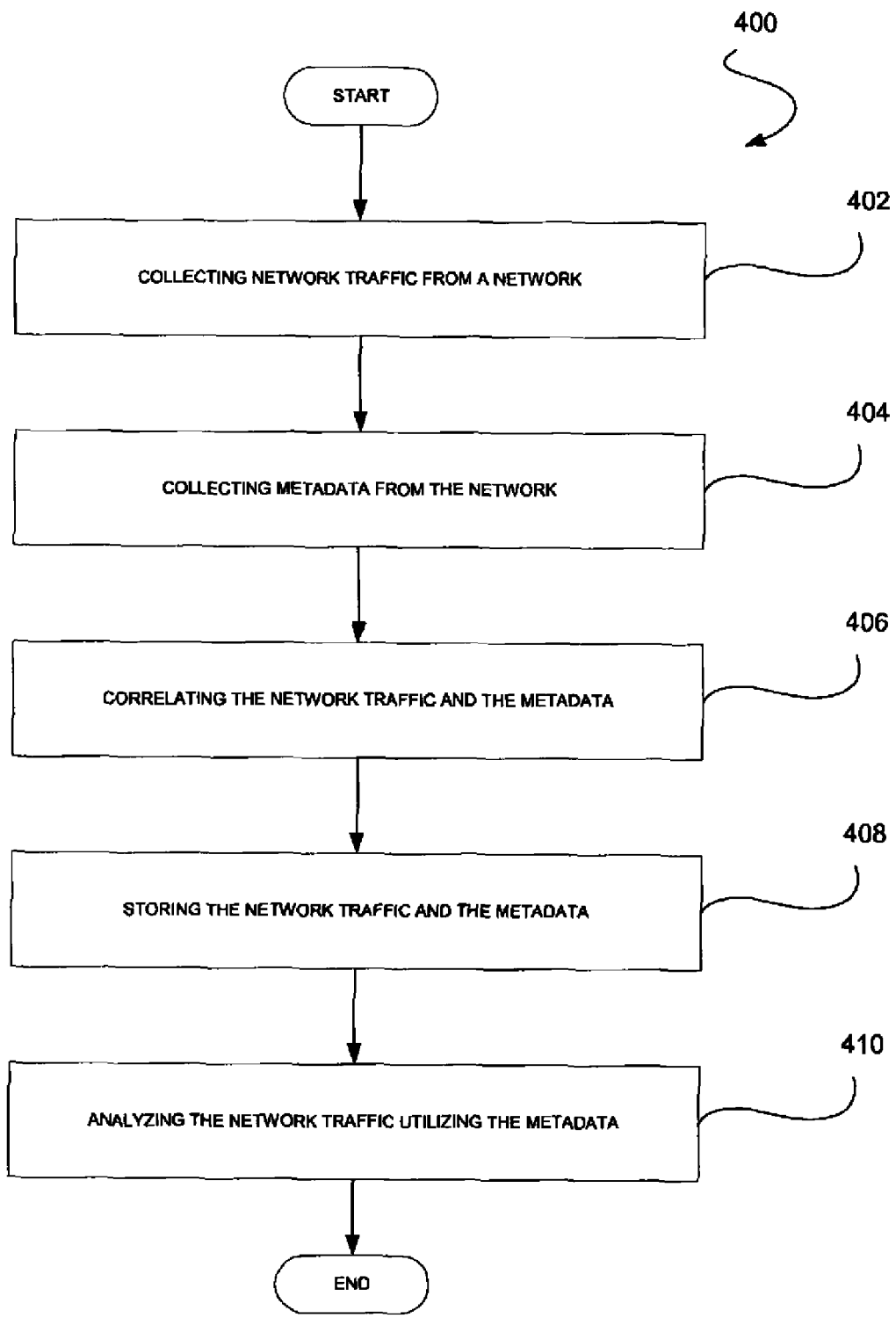
FIG. 4 illustrates a method for analyzing network traffic associated with network services, in accordance with one embodiment.

FIG. 4 illustrates a method 400 for analyzing network traffic associated with network services, in accordance with one embodiment. Optionally, the present method 400 may be implemented in the context of the framework of FIG. 3. Of course, the method 400 may be implemented in any desired context.

Initially, in operation 402, network traffic is collected from a network. In one embodiment, such network traffic may be collected utilizing a network traffic collector such as that set forth in FIG. 3. In operation 404, metadata is collected from the network. Optionally, this may be accomplished utilizing a metadata aggregator similar to that of FIG. 3. Just by way of example, the metadata collection operation 404 may be carried out using stored information in the network traffic, pre-configured metadata, or any number of other inputs.

Thereafter, the network traffic is correlated with the metadata. Note operation 406. While this may be accomplished in any desired manner, it may optionally be carried out by generating commands based on the network traffic and/or a software configuration associated with the environment in which the present embodiment is utilized.

In a specific optional embodiment where WSDL is utilized, the commands may include UDDI service calls. Specifically, the service calls may invoke the specific web service associated with a particular application service provider identified from the network traffic. Thus, the selection of the service calls is based on those that are listed by the UDDI as being associated with the particular application service provider identified from the network traffic.

After the metadata is initiated and collected as a function of the network traffic, the metadata and network traffic may be correlated in operation 406 and optionally stored together (or separately) in operation 408. It should be noted that the storage operation 408 may occur at any desired time during the present method 400. For example, the network traffic may be stored immediately after operation 402.

As an option, a network analyzer such as that of FIG. 3 may be used for the correlation, and the memory of FIG. 3 may be used for storage purposes. While the foregoing exemplary embodiment indicates that the metadata is collected after the network traffic, the network traffic may conceivably be collected after the metadata is collected. Still yet, the network traffic may be collected simultaneously with the metadata.

Next, in operation 410, the network traffic is analyzed utilizing the metadata. Again, this may be accomplished utilizing a network analyzer such as that of FIG. 3. In any case, the network services may include any type of service (i.e. combination of programming and data) that is carried out over a network such as the Internet. For illustrative purposes, a couple examples of such analysis will now be set forth in the context of FIGS. 5 and 6.

Figure 5:
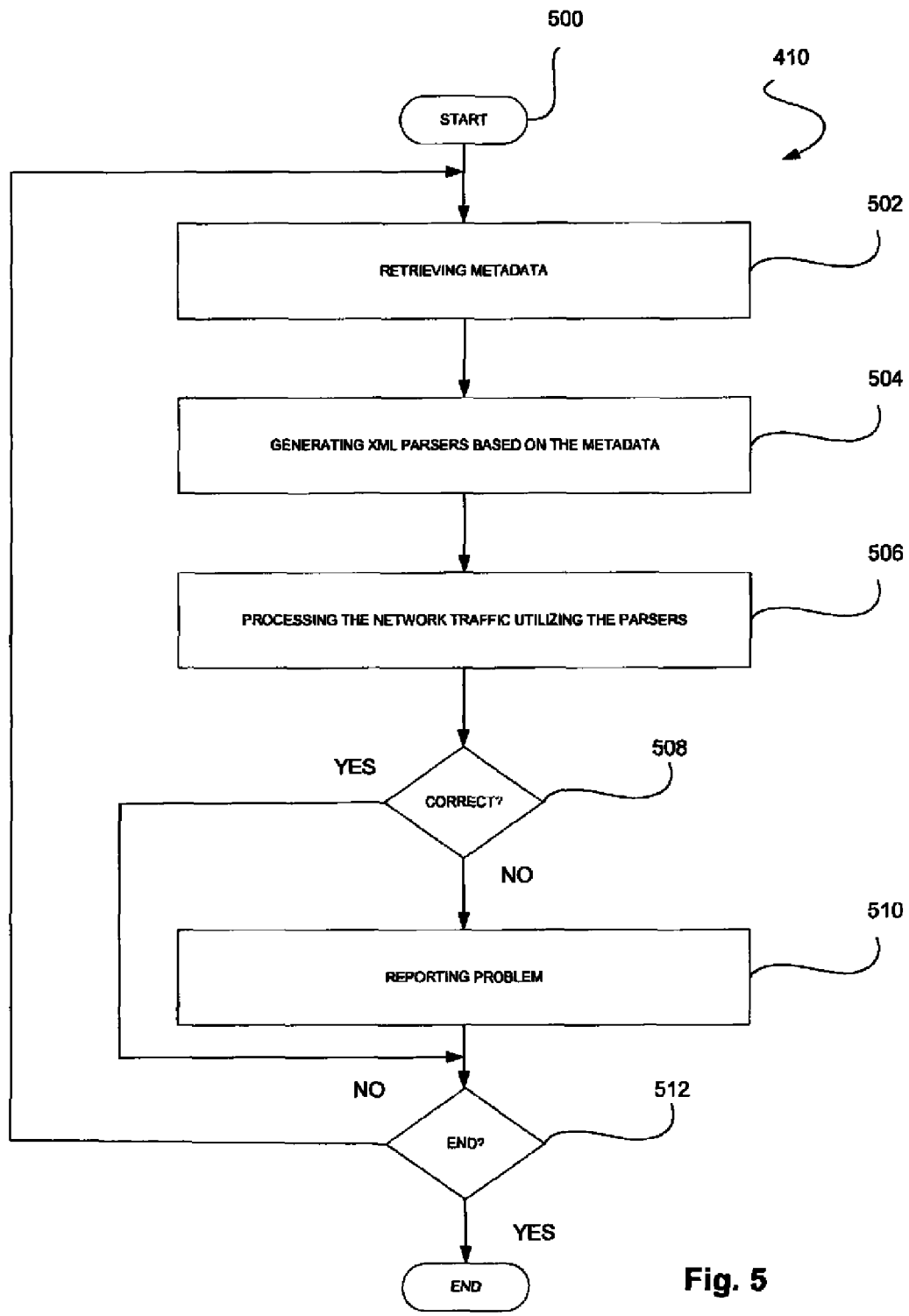
FIG. 5 illustrates a method for analyzing network traffic associated with web services, in accordance with one example of an implementation of operation 410 of FIG. 4.

FIG. 5 illustrates a method 500 for analyzing network traffic associated with network services, in accordance with one example of an implementation of operation 410 of FIG. 4. Optionally, the present method 500 may be implemented in the context of the framework of FIGS. 1-3, and method of FIG. 4. Of course, the method 500 may be implemented in any desired context.

As shown, the collected and stored web service metadata is first retrieved in operation 502. In the present embodiment, the metadata may include WSDL documents.

Thereafter, a plurality of parsers is generated. See operation 504. In the context of the present description, a parser is a program, possibly part of a compiler, that receives input in the form of sequential source program instructions, interactive online commands, markup tags, or some other defined interface and breaks them up into parts [i.e. the nouns (objects), verbs (methods), and their attributes or options] that can then be managed by other programming (i.e., other components in a compiler). A parser may also check to see that all input has been provided that is necessary.

The parsers generated in operation 504 may be generated based on the WSDL documents. Specifically, each of the parsers may be associated with a corresponding portion of the metadata. Moreover, each of the parsers may indicate a syntax or other aspect that is expected of the network traffic associated with the correlated portion of the metadata.

To this end, in operation 506, the analysis of the network traffic may further include processing the network traffic utilizing the parsers. In particular, it may be determined in decision 508 as to whether the network traffic is correct. For example, it may be determined whether the web service invocations and responses are correctly formed.

If, a problem in syntax or other aspect of the network traffic is discovered in decision 508, the problem may be reported or corrected in any desired manner. See operation 510. Moreover, the method 500 may be continued until all of the recorded network traffic has been analyzed, per decision 512.

It should be noted that the analysis of FIG. 5 is set forth for illustrative purposes only, and should not be construed as limiting in any manner. For example, an arrangement is foreseeable where several replicas of the same process are provided for working on the same data. If all of the replicas provide the same outputs, then, presumably, there are no problems to report/correct. If one diverges, however, the other replicas determine that it is "Byzantine" and vote it out of the group of replicas. Usually, this is done in an arrangement where only one replica responds to service requests and the others just listen. If the quiet replicas see the active replica misbehave, they stop listening to the misbehaver and elect a new active replica. This technique is usually called "semi-active replication with voting." Math proofs show that, as long as there are 3x+1 replicas, up to x of them can fail before the remaining correct ones can be affected.

Alternately, a separate process may be provided that monitors the integrity of a client-server interaction by checking signatures on those messages and flagging an error if a message fails to authenticate. For example, metadata may be used to indicate what is to be authenticated and what is not to be authenticated, and how to accomplish that authentication. Similarly, metadata could indicate where and how to scan the payload of web services for malware, such as viruses. Of course, any type of network analysis may be employed.

The present look-aside network traffic capture technique is thus beneficial in analyzing network traffic associated with network services. The analysis system first captures the network traffic that the user desires to examine. Next, or concurrently on another processor, the analysis system examines the captured network traffic and recognizes the messages generated by network services (i.e. web services) and their clients.

Thereafter, the analysis system makes its own calls to standard services such as the description and discovery services, to acquire the metadata about the services being examined. It stores the supporting metadata, with optionally capture timestamps for the metadata, in memory. Doing this permits one to retrieve the captured data and the captured metadata together. The metadata may then be used to check and analyze the captured network traffic and present an analysis and interpretation of the network traffic to the user.

Again, the foregoing examples of network analysis are set forth for illustrative purposes only, and should not be construed as limiting in any manner. Moreover, the analysis of the network traffic may include any type of processing that involves the metadata.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for analyzing network traffic associated with network services, comprising:

collecting network traffic from a network; collecting metadata associated with the network traffic from the network;

analyzing the network traffic utilizing the metadata, the analyzing including generating a plurality of parsers based on the metadata, utilizing a processor; and identifying an application service provider from the network traffic;

wherein the metadata is correlated with the network traffic, and the correlated metadata is stored in a memory;

wherein the correlating of the metadata with the network traffic is carried out by generating commands based on the network traffic and a software configuration;

wherein the commands include universal description, discovery, and integration (UDDI) service calls that invoke at least one web service associated with the application service provider identified from the network traffic;

wherein the parsers are programs that receive input in a form of at least one of sequential source program instructions, interactive online commands, markup tags, and a defined interface;

wherein the parsers break the input into parts including objects, methods, and associated attributes or options;

wherein a selection of the UDDI service calls is based on UDDI service calls listed by a UDDI as being associated with the application service provider identified from the network traffic;

wherein the metadata is utilized to indicate which messages of the network traffic should be authenticated, indicate which messages of the network traffic should not be authenticated, and indicate how to authenticate the messages.

2. The method as recited in claim 1, wherein the network includes an Internet.

3. The method as recited in claim 2, wherein the network services include web services.

4. The method as recited in claim 1, wherein the network traffic is correlated with the metadata prior to the analysis of the network traffic.

5. The method as recited in claim 4, wherein the correlating includes initiating the commands for retrieving the metadata as a function of the software configuration.

6. The method as recited in claim 4, wherein the correlating includes initiating the commands for retrieving the metadata as a function of the network traffic.

7. The method as recited in claim 5, wherein the commands include calls to other services.

8. The method as recited in claim 1, and further comprising storing the network traffic and the metadata prior to the analysis of the network traffic.

9. The method as recited in claim 8, wherein the analysis of the network traffic occurs after an extended period following the collection of the network traffic and the metadata.

10. The method as recited in claim 1, wherein the network traffic is collected after the metadata is collected.

11. The method as recited in claim 1, wherein the network traffic is collected before the metadata is collected.

12. The method as recited in claim 1, wherein the network traffic is collected simultaneously with the metadata.

13. The method as recited in claim 1, wherein each of the parsers is associated with a corresponding portion of the metadata.

14. The method as recited in claim 1, wherein the analysis of the network traffic further includes processing the network traffic utilizing the parsers.

15. The method as recited in claim 14, wherein the analysis of the network traffic further includes reporting on at least one aspect of the network traffic based on the processing.

16. The method as recited in claim 1, wherein the analysis of the network traffic includes authenticating the network traffic.

17. The method as recited in claim 16, wherein the network traffic is authenticated based on an authentication test involving the metadata.

18. A computer program product embodied on a non-transitory computer-readable medium, comprising:
computer code for collecting network traffic from a network;
computer code for collecting metadata associated with the network traffic from the network;
computer code for analyzing the network traffic utilizing the metadata, the analyzing including generating a plurality of parsers based on the metadata; and
computer code for identifying an application service provider from the network traffic;
wherein the computer program product is operable such that the metadata is correlated with the network traffic, and the correlated metadata is stored in a memory;
wherein the correlating of the metadata with the network traffic is carried out by generating commands based on the network traffic and a software configuration;
wherein the commands include universal description, discovery, and integration (UDDI) service calls that invoke at least one web service associated with the application service provider identified from the network traffic;
wherein the parsers are programs that receive input in a form of at least one of sequential source program instructions, interactive online commands, markup tags, and a defined interface;
wherein the parsers break the input into parts including objects, methods, and associated attributes or options;
wherein the computer program product is operable such that a selection of the UDDI service calls is based on UDDI service calls listed by a UDDI as being associated with the application service provider identified from the network traffic;
wherein the computer program product is operable such that the metadata is utilized to indicate which messages of the network traffic should be authenticated, indicate which messages of the network traffic should not be authenticated, and indicate how to authenticate the messages.

19. A system implemented in hardware, comprising:
a network traffic collector for collecting network traffic from a network;
a metadata aggregator for collecting metadata associated with the network traffic from the network;
a network analyzer coupled to the network traffic collector and the metadata aggregator, the network analyzer adapted for analyzing the network traffic utilizing the metadata; and
logic for identifying an application service provider from the network traffic;
wherein the system is operable such that the metadata is correlated with the network traffic, and the correlated metadata is stored in a memory;
wherein the system is operable such that the analysis of the network traffic includes generating a plurality of parsers based on the metadata;
wherein the correlating of the metadata with the network traffic is carried out by generating commands based on the network traffic and a software configuration;
wherein the commands include universal description, discovery, and integration (UDDI) service calls that invoke at least one web service associated with the application service provider identified from the network traffic;
wherein the parsers are programs that receive input in a form of at least one of sequential source program instructions, interactive online commands, markup tags, and a defined interface;
wherein the parsers break the input into parts including objects, methods, and associated attributes or options;
wherein the system is operable such that a selection of the UDDI service calls is based on UDDI service calls listed by a UDDI as being associated with the application service provider identified from the network traffic;
wherein the system is operable such that the metadata is utilized to indicate which messages of the network traffic should be authenticated, indicate which messages of the network traffic should not be authenticated, and indicate how to authenticate the messages.

20. A system implemented in hardware, comprising:
means for collecting network traffic from a network;
means for collecting metadata associated with the network traffic from the network;
means for analyzing the network traffic utilizing the metadata, the analyzing including generating a plurality of parsers based on the metadata; and
means for identifying an application service provider from the network traffic;
wherein the system is operable such that the metadata is correlated with the network traffic, and the correlated metadata is stored in a memory;
wherein the correlating of the metadata with the network traffic is carried out by generating commands based on the network traffic and a software configuration;
wherein the commands include universal description, discovery, and integration (UDDI) service calls that invoke at least one web service associated with the application service provider identified from the network traffic;
wherein the parsers are programs that receive input in a form of at least one of sequential source program instructions, interactive online commands, markup tags, and a defined interface;
wherein the parsers break the input into parts including objects, methods, and associated attributes or options;
wherein the system is operable such that a selection of the UDDI service calls is based on UDDI service calls listed by a UDDI as being associated with the application service provider identified from the network traffic;
wherein the system is operable such that the metadata is utilized to indicate which messages of the network traffic should be authenticated, indicate which messages of the network traffic should not be authenticated, and indicate how to authenticate the messages.

21. A method for analyzing network traffic, comprising:
collecting network traffic and metadata from a network for analyzing the network traffic and the metadata for the purpose of analyzing a web service associated therewith, and
dentifying an application service provider from the network traffic;
wherein the metadata is correlated with the network traffic, and the correlated metadata is stored in a memory;
wherein the analysis of the network traffic includes generating a plurality of parsers based on the metadata;
wherein the correlating of the metadata with the network traffic is carried out by generating commands based on the network traffic and a software configuration;

wherein the commands include universal description, discovery, and integration (UDDI) service calls that invoke at least one web service associated with the application service provider identified from the network traffic;

wherein the parsers are programs that receive input in a form of at least one of sequential source program instructions, interactive online commands, markup tags, and a defined interface;

wherein the parsers break the input into parts including objects, methods, and associated attributes or options;

wherein a selection of the UDDI service calls is based on UDDI service calls listed by a UDDI as being associated with the application service provider identified from the network traffic;

wherein the metadata is utilized to indicate which messages of the network traffic should be authenticated, indicate which messages of the network traffic should not be authenticated, and indicate how to authenticate the messages.

22. A method for analyzing network traffic associated with web services, comprising:

collecting network traffic from a plurality of application service providers over a network utilizing a processor, the network traffic being associated with web services provided by the application service providers;

collecting metadata associated with the network traffic from the network; analyzing the network traffic utilizing the metadata for investigating a quality of the web services, the analyzing including generating a plurality of parsers based on the metadata, utilizing a processor; and identifying an application service provider from the network traffic;

wherein the metadata is correlated with the network traffic, and the correlated metadata is stored in a memory;

wherein the correlating of the metadata with the network traffic is carried out by generating commands based on the network traffic and a software configuration;

wherein the commands include universal description, discovery, and integration (UDDI) service calls that invoke at least one web service associated with the application service provider identified from the network traffic;

wherein the parsers are programs that receive input in a form of at least one of sequential source program instructions, interactive online commands, markup tags, and a defined interface;

wherein the parsers break the input into parts including objects, methods, and associated attributes or options;

wherein a selection of the UDDI service calls is based on UDDI service calls listed by a UDDI as being associated with the application service provider identified from the network traffic;

wherein the metadata is utilized to indicate which messages of the network traffic should be authenticated, indicate which messages of the network traffic should not be authenticated, and indicate how to authenticate the messages.

23. A method for analyzing network traffic associated with web services, comprising:

collecting network traffic from a network associated with web services, utilizing a processor;

correlating the network traffic and metadata associated with the network traffic by:

initiating commands, and collecting the metadata associated with the network traffic in response to the commands; storing the network traffic and the metadata;

analyzing the network traffic utilizing the metadata, the analyzing including generating a plurality of parsers based on the metadata, utilizing a processor; and identifying an application service provider from the network traffic;

wherein the correlating of the metadata with the network traffic is carried out by generating the commands based on the network traffic and a software configuration;

wherein the commands include universal description, discovery, and integration (UDDI) service calls that invoke at least one web service associated with the application service provider identified from the network traffic;

wherein the parsers are programs that receive input in a form of at least one of sequential source program instructions, interactive online commands, markup tags, and a defined interface;

wherein the parsers break the input into parts including objects, methods, and associated attributes or options;

wherein a selection of the UDDI service calls is based on UDDI service calls listed by a UDDI as being associated with the application service provider identified from the network traffic;

wherein the metadata is utilized to indicate which messages of the network traffic should be authenticated, indicate which messages of the network traffic should not be authenticated, and indicate how to authenticate the messages.

24. The method as recited in claim 1, wherein the metadata includes database schemas.

25. The method as recited in claim 1, wherein the metadata includes certificates.

26. The method as recited in claim 1, wherein the metadata is collected from the network traffic.

27. The method as recited in claim 1, wherein the metadata includes Web Service Definition Language (WSDL) documents.

28. The method as recited in claim 1, wherein the metadata is collected by a metadata aggregator.

29. The method as recited in claim 1, wherein the network traffic is collected by a network traffic collector.

30. The method as recited in claim 1, wherein the application service provider provides the at least one web service.

31. The method as recited in claim 30, wherein the at least one web service includes at least one of a storage management service and a customer relationship management service.

32. The method as recited in claim 30, wherein the at least one web service is accessed via a peer-to-peer arrangement.

33. The method as recited in claim 1, wherein the collecting of the metadata uses stored information in the network traffic and preconfigured metadata.

34. The method as recited in claim 13, wherein each of the parsers indicates a syntax that is expected of the network traffic associated with the corresponding portion of the metadata.

35. The method as recited in claim 34, wherein if a problem with the expected syntax of the network traffic is discovered, then the problem is either reported or corrected.

36. The method as recited in claim 1, wherein the analyzing of the network traffic includes determining whether the network traffic is correct by determining whether web service invocations and responses are correctly formed.

* * * * *